UNITED STATES PATENT OFFICE.

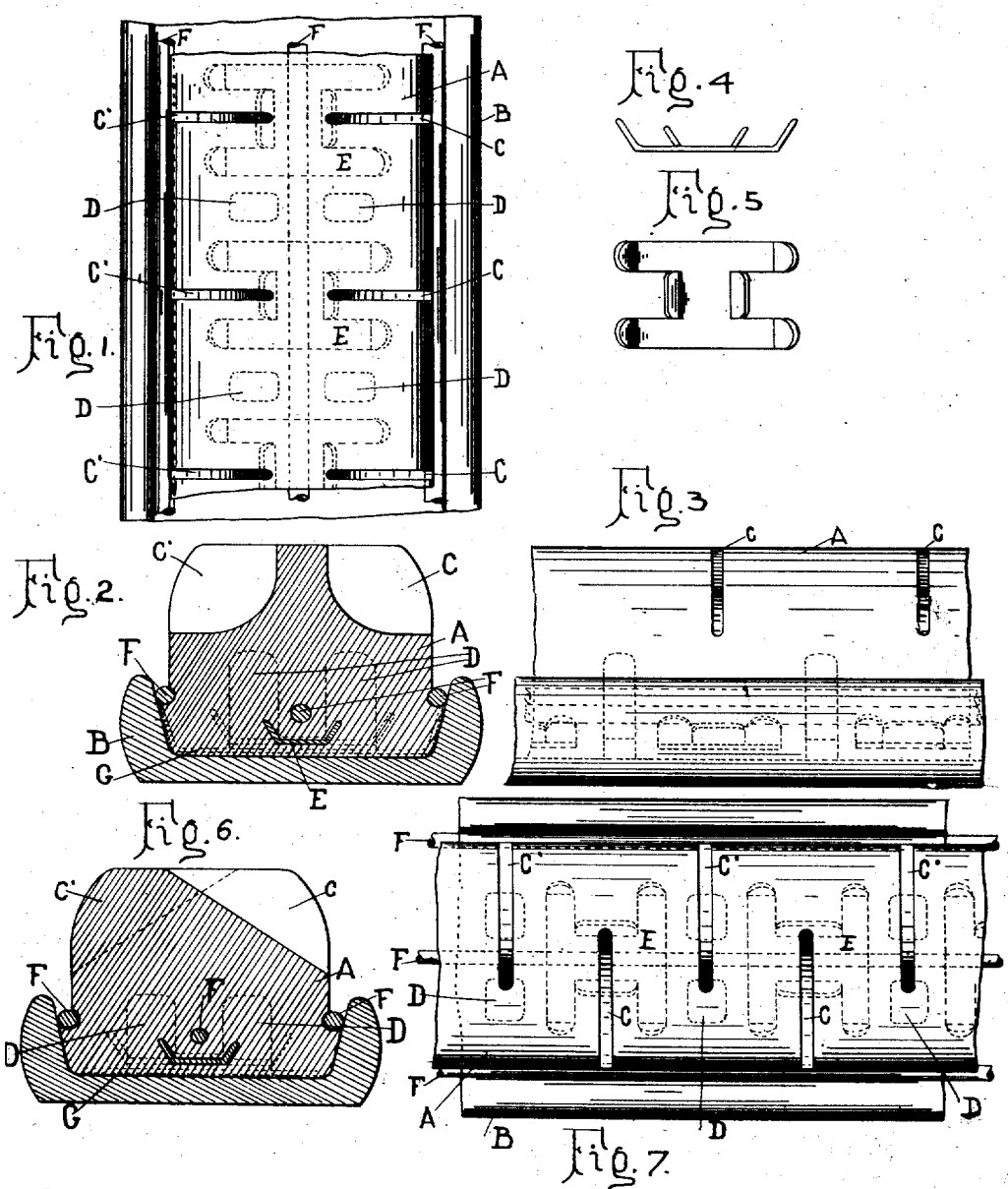

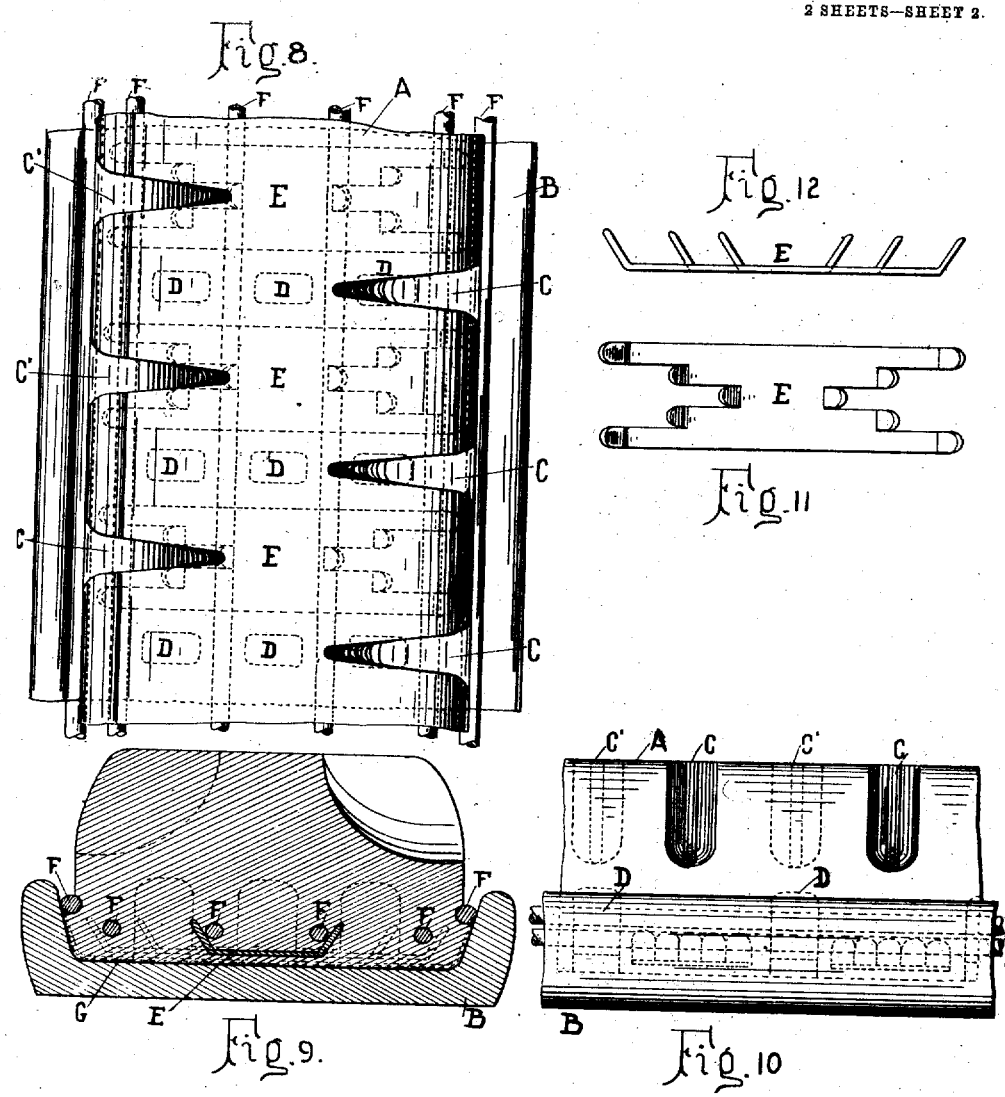

EDWIN B. CADWELL, OF NEW YORK, N. Y., ASSIGNOR OF ONE-THIRD TO FRANK JOHNSTON AND ONE-THIRD TO FRANK M. ASHLEY.

TIRE.

No. 846,453.   Specification of Letters Patent.   Patented March 12, 1907.

Application filed March 24, 1904. Serial No. 199,676.

*To all whom it may concern:*

Be it known that I, EDWIN B. CADWELL, a citizen of the United States, residing at the city, county, and State of New York, have invented certain new and useful Improvements in Tires, of which the following is a specification.

My invention in vehicle-tires relates to that class usually constructed of rubber, gum, or other compositions which permit of considerable resiliency, and particularly to cushion-tires wherein a number of cells are formed within the tire to permit of considerable range of yielding beyond that which the material itself permits. In tires of this character heretofore, due to the strain imposed upon the material when the vehicle is in transit, particularly when the tire is employed in propelling-wheels, the tensile strength is somewhat impaired.

It is the object of my invention to so construct these tires that the material will be displaced sufficiently to give the required resiliency and at the same time maintain the tensile strength in the longitudinal or driving direction of the wheel to which the tire is secured.

It is a further object of my invention to increase the tractive effort and prevent slipping on wet pavements and the like, while at the same time maintaining the longitudinal strength, whereby the tension of the material will not be taxed to as great an extent as by those constructions of a similar character heretofore in vogue and previous to my invention of which I am at present aware.

Still another object of importance is attained by my improvements in the reduction of the cost of production of tires of this character, since they may be made of either a single length united so as to form the circle or built up of sections which when united at their ends comprise the complete tire.

Further objects of my invention will be found in studying the several sheets of drawings hereto attached, which form part of this application, as well as in the descriptive matter relating thereto, and the distinct features of novelty will be emphasized in the claims.

With reference to the drawings, Figure 1 is a top plan view of a tire embodying my invention in which recesses are shown located opposite each other and extending toward the center of the tire and a portion of the rim of a wheel in accordance with my invention, the dotted lines indicating metal holding-clips and cells, which will be more fully described hereinafter. Fig. 2 is a vertical sectional elevation of the same tire, taken centrally through a pair of the recesses. Fig. 3 is a vertical longitudinal view of the same. Fig. 4 is an edge or like view of the metal clip indicated in the dotted lines in Fig. 1. Fig. 5 is a plan view of the same. Fig. 6 is a vertical section of another form of the tire in which the recesses are not placed opposite each other, but are arranged in staggered relation to each other, and in which the recesses extend across the greater width of the tire, for reasons hereinafter explained. Fig. 7 is a plan view of the tire shown in Fig. 6. Fig. 8 is a plan view of a tire having a wider tread and designed to carry exceptionally heavy loads and in which the recesses are V-shaped in form. Fig. 9 is a vertical sectional elevation of the same. Fig. 10 is a side elevation of the same. Fig. 11 is a plan view of a clip suitable for tires as shown in Figs. 8 and 9. Fig. 12 is a side view of the said clip.

In Figs. 1, 2, 3, 6, 7, 8, 9, and 10 the tires are illustrated as resting in the channel-piece which forms the rim of the wheel and which is of the usual form well known in the art. In tires of this character heretofore in general use the material from which the tire has been constructed, which was usually of soft rubber, has been molded from a single piece or strip of rubber. When tires are thus formed and the pressure is exerted on the tread of the same due to the load of the vehicle, the rubber would flow in the lines of least resistance, which in a tire such as just referred to would be laterally, as there is no place for the rubber to flow in its line of rotation except by compressing the rubber directly before and behind the line of tread, and as the rubber is a material which is noncompressible, but flows due to displacement only, it follows that the greater portion of the material will flow laterally, and thus increase the width of the tread on the pavement. Under heavy loads this displacement causes the rubber to be taxed beyond its elastic limit, with the result that rapid disintegration takes place in the tire, due to the effects of excessive stress and heat within the material resulting therefrom. It is also a fact that where the tire is made of a continuous strip without provision for the material to flow in a longitudinal direction that excessive creeping results—that is, the tire tends to change its position in the rim—and it has been found necessary to remedy this defect by the use of holding-lugs, cement, and other devices.

In cellular tires heretofore designed the walls which support the cells from each other have been made thin and flexible, so that the tire under pressure would deflect the walls, and thereby cause the action known as "cushioning" to result.

In the present invention the walls are made of such thickness that they will not be deflected by the pressure on the tread, but instead the rubber when under compression will tend to flow in the cells which are formed in the base of the tire, and as these cells are closed at the base they form separate pneumatic chambers, which assist the tire to carry the load and also effect a good cushioning action.

In order to effect the main object of this invention, I form in the tread of the tire a series of grooves or recesses spaced in a longitudinal direction a distance from each other less than the width of the tire, whereby when under compression the rubber will flow equally in all directions, thus relieving excessive stress in the material, and by the supplemental use of the cells arranged in the base of the tire I am able to produce a tire which is durable and of easy-riding qualities. As this result must be obtained without sacrificing the strength of the tire in its longitudinal direction, I form the same so that the center of the tire will retain its maximum strength.

Referring now to the drawings which form a part of this application, and in which similar letters of reference indicate identical parts, A represents the tire.

B represents the channel-piece or rim in which the tire is usually secured.

C represents the recesses on the right side of the tire, and C' the recesses on the left.

D represents the cells in the base of the tire, (represented by dotted lines.)

E indicates the metal holding-clips, which are inclosed in the rubber in the process of manufacturing.

F indicates the binding-wire commonly used to secure the tire in the channel or rim, and G indicates the canvas or other flexible material which is used to form a base-strip and serves to close the cells D air-tight.

Where a tire is to be used under very heavy loads, the cells D may be dispensed with, if desired, as sufficient resiliency will be effected by the recesses C and C'. It will be noted that a central web is formed running longitudinally of the tire, which web extends to the base of same, and that the cells D are located on each side of this web. This construction maintains the strength of the tire in its longitudinal direction, and where the recesses C and C' are placed opposite each other, as shown in Fig. 1, the web is carried entirely to the surface, whereas when the said recesses are arranged in staggered relation to each other they may extend across the center of the tire, as shown in Figs. 6 and 7.

Referring to Fig. 8, it will be observed that the recesses C and C' are made V-shaped in form. This form allows mud and other foreign substances to be forced out of the recesses more easily than when said recesses are made as shown in Fig. 1 and also effects a considerable saving of rubber and reduces the weight of the tire. The recesses formed in or near the surface of the tread of the tire increases the tractive qualities of the same and prevents the tire from slipping on wet pavements, both of which are important. It will also be noted that the rubber is formed so that none of the ribs or walls will bend, but that it will simply be displaced by compression and tend to flow toward the recesses C and C' and cells D. The metal clips E are formed with ruptured sides, as shown in Figs. 4 and 5 and 11 and 12. The ruptured sides prevent them from becoming displaced.

Referring to Fig. 9, it will be seen that when the binding-wires F are drawn tight they coöperate with the edges of the clips E, which tend to bend outward, and thus press the rubber firmly into the channel or rim B.

When the tire is made up of separate sections united at their ends, I prefer to make said sections longitudinal to include about six of the blocks or recesses, as shown in Fig. 1, and place the canvas strip G on each section and then united the sections end to end with liquid rubber-cement, thus forming the complete tire. It will be noted that this can easily be done, as there is no canvas covering or parts that would be difficult to make, and in case of repairs a new section can easily be substituted for a damaged one. This tire is easy to mold, easy to repair, is resilient and elastic, has good traction qualities, is light, cheap, and durable, and entirely dispenses with the canvas and rubber covering heretofore deemed necessary in this type of tires.

Having thus described my invention, what I claim as new, and desire to secure by Letters Patent, is—

1. A tire having recesses in its sides which extend toward the center of the tread, said recesses being spaced from each other less than the width of the tire, said tire having cells formed in the base thereof, substantially as described.

2. A tire having recesses in its sides which extends toward the center of its tread, said recesses being staggered relative to each other, in combination with cells in its base; substantially as described.

3. A tire having recesses in its sides and tread which extend toward the center of the tread, said recesses being V-shaped in form, in combination with cells in its base; substantially as described.

4. A tire having recesses in its sides in combination with cells in its base, and a strip of flexible material to seal the open ends of said cells; substantially as described.

5. A tire composed of separable sections, each section having recesses in its sides above its base-section, and cells in its base; substantially as described.

6. A tire composed of separable sections, each section having recesses in its sides, above its base-section, cells in its base and holding-clips in its base, substantially as described.

7. A tire composed of separate sections, each section having recesses in its sides, above its base-section, cells in its base, and means whereby the sections may be united to the rim of the wheel; substantially as described.

8. A tire composed of separable yielding sections, each section having V-shaped recesses in its sides and cells in its base; substantially as described.

9. A tire composed of separable sections, each section having recesses in its sides extending toward the center of the tread, with cells in its base located on each side of the center of said tire-section and forming thereby a central web which extends from the base of the tire to the surface of the tread; substantially as described.

10. A tire having recesses in its sides extending toward the center of the tread, cells in its base on each side of the center of the tire, and binding-wires extending through the solid portion of the tire; substantially as described.

11. A tire composed of separate sections, each section having recesses in its sides and cells in its base, and a holding-plate located in each section.

12. A tire composed of separate sections, each section having recesses in its sides and cells in its base, a holding-plate in each section and provision for holding said sections together on a wheel.

13. A tire having recesses in its sides and cells in its base and holding-clips comprising metal plates having their outer edges turned upward at an angle as shown.

14. A tire having recesses in its sides adapted to contact under tread compression, and closed pneumatic cells in its base.

15. A tire having recesses in its sides adapted to contact under tread compression, closed pneumatic cells in its base, and means for holding said tire to a wheel.

In testimony whereof I have signed my name to this specification in the presence of two subscribing witnesses.

EDWIN B. CADWELL.

Witnesses:
FRANK M. ASHLEY,
GUSTAVE HARTUNG.

---

It is hereby certified that in Letters Patent No. 846,453, granted March 12, 1907, upon the application of Edwin B. Cadwell, of New York, N. Y., for an improvement in "Tires," errors occur in the printed specification requiring correction, as follows: In lines 55 and 58, page 3, the word "contact" should read *contract;* and that the said Letters Patent should be read with these corrections therein that the same may conform to the record of the case in the Patent Office.

Signed and sealed this 9th day of April, A. D., 1907.

[SEAL.]

E. B. MOORE,
*Acting Commissioner of Patents.*

3. A tire having recesses in its sides and tread which extend toward the center of the tread, said recesses being V-shaped in form, in combination with cells in its base; substantially as described.

4. A tire having recesses in its sides in combination with cells in its base, and a strip of flexible material to seal the open ends of said cells; substantially as described.

5. A tire composed of separable sections, each section having recesses in its sides above its base-section, and cells in its base; substantially as described.

6. A tire composed of separable sections, each section having recesses in its sides, above its base-section, cells in its base and holding-clips in its base, substantially as described.

7. A tire composed of separate sections, each section having recesses in its sides, above its base-section, cells in its base, and means whereby the sections may be united to the rim of the wheel; substantially as described.

8. A tire composed of separable yielding sections, each section having V-shaped recesses in its sides and cells in its base; substantially as described.

9. A tire composed of separable sections, each section having recesses in its sides extending toward the center of the tread, with cells in its base located on each side of the center of said tire-section and forming thereby a central web which extends from the base of the tire to the surface of the tread; substantially as described.

10. A tire having recesses in its sides extending toward the center of the tread, cells in its base on each side of the center of the tire, and binding-wires extending through the solid portion of the tire; substantially as described.

11. A tire composed of separate sections, each section having recesses in its sides and cells in its base, and a holding-plate located in each section.

12. A tire composed of separate sections, each section having recesses in its sides and cells in its base, a holding-plate in each section and provision for holding said sections together on a wheel.

13. A tire having recesses in its sides and cells in its base and holding-clips comprising metal plates having their outer edges turned upward at an angle as shown.

14. A tire having recesses in its sides adapted to contact under tread compression, and closed pneumatic cells in its base.

15. A tire having recesses in its sides adapted to contact under tread compression, closed pneumatic cells in its base, and means for holding said tire to a wheel.

In testimony whereof I have signed my name to this specification in the presence of two subscribing witnesses.

EDWIN B. CADWELL.

Witnesses:
FRANK M. ASHLEY,
GUSTAVE HARTUNG.

---

It is hereby certified that in Letters Patent No. 846,453, granted March 12, 1907, upon the application of Edwin B. Cadwell, of New York, N. Y., for an improvement in "Tires," errors occur in the printed specification requiring correction, as follows: In lines 55 and 58, page 3, the word "contact" should read *contract;* and that the said Letters Patent should be read with these corrections therein that the same may conform to the record of the case in the Patent Office.

Signed and sealed this 9th day of April, A. D., 1907.

[SEAL.]

E. B. MOORE,
*Acting Commissioner of Patents.*

It is hereby certified that in Letters Patent No. 846,453, granted March 12, 1907, upon the application of Edwin B. Cadwell, of New York, N. Y., for an improvement in "Tires," errors occur in the printed specification requiring correction, as follows: In lines 55 and 58, page 3, the word "contact" should read *contract;* and that the said Letters Patent should be read with these corrections therein that the same may conform to the record of the case in the Patent Office.

Signed and sealed this 9th day of April, A. D., 1907.

[SEAL.]

E. B. MOORE,
*Acting Commissioner of Patents.*